United States Patent [19]

Crowe et al.

[11] 3,975,353

[45] Aug. 17, 1976

[54] THERMOSETTING MOULDING COMPOSITIONS

[75] Inventors: Alan Crowe, Dinas Powis; David Philip Fry, Llanishen, both of Wales

[73] Assignee: PB Chemicals International Limited, England

[22] Filed: May 15, 1972

[21] Appl. No.: 253,149

[30] Foreign Application Priority Data

May 20, 1971 United Kingdom............... 15982/71

[52] U.S. Cl................................. 260/40 R; 260/873
[51] Int. Cl.² ..................... C08G 63/76; C08K 3/40
[58] Field of Search ........................... 260/873, 40 R

[56] References Cited
UNITED STATES PATENTS

| | | | |
|---|---|---|---|
| 3,489,707 | 1/1970 | Fry | 260/40 R X |
| 3,549,586 | 12/1970 | Smith et al. | 260/861 X |
| 3,642,683 | 2/1972 | Fry | 260/862 X |
| 3,668,178 | 6/1972 | Comstock et al. | 260/861 X |

*Primary Examiner*—Lewis T. Jacobs
*Assistant Examiner*—S. M. Person

[57] ABSTRACT

Sheet moulding compounds based on thermosetting unsaturated polyester resins contain a saturated liquid polyester having a melting point below 30°C, for example polypropylene adipate or polypropylene sebacate to prevent shrinkage during moulding, and a thermoplastic polymer consisting essentially of polymerized caprolactone units to prevent exudation of the saturated liquid polyester during moulding.

6 Claims, No Drawings

THERMOSETTING MOULDING COMPOSITIONS

The present invention relates to unsaturated polyester resin compositions and particularly to thermosetting moulding compounds in the form of sheet moulding compounds prepared therefrom.

By sheet moulding compound is meant throughout this specification a fibrous reinforcing mat impregnated with a composition containing as essential components an unsaturated polyester and a monomeric material which is copolymerisable therewith, said poymerisable components being compounded with conventional catalysts, fillers etc., the whole forming a stable, moulding compound in the form of a sheet which can be fabricated into hard, infusible, shaped articles by the action of heat and pressure in a heated mould. Sheet moulding compounds are known.

Unsaturated polyester moulding compounds have the disadvantage that when moulded into infusible articles, they tend to crack and shrink to give articles having poor quality moulded surfaces, particularly when used in the production of articles having relatively thick sections. In our published British Patent Specification No. 1,098,132 it is proposed that unsaturated polyester moulding compositions for moulding at elevated temperatures and pressures should contain a saturated liquid polyester to prevent shrinkage and cracking on moulding, and sufficient thermoplastic polymer, which polymer is capable of being plasticised by said saturated liquid polyester, to prevent the deleterious exudation of the saturated liquid polyester on moulding. This system is particularly useful in dough moulding compounds because the shrinkage and exudation can be entirely eliminated, but when it is used in sheet moulding compounds, which generally have a higher liquid content than dough moulding compounds, and contain thickening (maturation) agents such as group II metal oxides and hydroxides, it cannot be used to give practical control of the shrinkage, owing to a tendency for exudation of the resin system to occur before moulding.

It is an object of the present invention to provide sheet moulding compounds which can be moulded at elevated temperatures and pressures to give improved moulded articles. It is a further object to provide sheet moulding compounds which can be moulded to give moulded articles which are relatively free from cracks and shrinkage and which accurately reproduce the surface of the mould.

Accordingly, the present invention is an unsaturated polyester resin composition for sheet moulding compounds comprising (1) an unsaturated polyester, (2) a copolymerisable monomer, (3) a saturated liquid polyester and (4) a thermoplastic polymer consisting essentially of polymerised caprolactone units.

Unsaturated polyesters for use in moulding compositions are well known. See for example, British Patent Specification No. 1098132. The preferred unsaturated polyesters for use in the compositions of the present invention are those which have a relatively high hot rigidity in the thermoset state, so that any reduction of rigidity due to the presence of the saturated polyester is offset. Examples of such unsaturated polyesters are those in which more than 50 molar per cent of their acidic residues are derived from maleic or fumaric acids. Examples are polypropylene glycol maleate or fumarate, or such unsaturated polyesters with a minor proportion of the maleic or fumaric residues replaced by isophthalic or carbic acid residues. Also suitable are unsaturated polyesters containing more than 50 molar per cent of maleic and fumaric acid residues and alcohol residues derived from the Bisphenol A adducts of ethylene oxide or propylene oxide. Further suitable unsaturated polyesters are those in which a minor proportion of the maleic or fumaric acid residues are replaced by chloro-acid residues such as tetra-chlorophthalic or chlorendic acid residues.

The copolymerisable monomer is suitably a liquid monomer having $\alpha,\beta$-ethylenic unsaturation for example styrene, vinyl toluene and diallyl phthalate. The unsaturated polyester is usually dissolved in the copolymerisable monomer. The amount of copolymerisable monomer used is suitably in the range from 20 to 60% by weight and preferably from 40 to 50% by weight based on the total weight of the unsaturated polyester resin and copolymerisable monomer.

The saturated liquid polyesters suitable for use in the compositions of the present invention are those substances which are known per se mainly as plasticisers for various thermoplastic resins. The saturated polyesters are liquid, by which it is meant that they have a melting point below 30°C. They are prepared by esterifying a polyhydric alcohol with a polybasic acid. Particularly preferred are the saturated polyesters prepared by the inter-esterification of propylene glycol with adipic acid to give a polypropylene adipate such as Hexaplas PPA (Hexaplas is a registered trade mark) and the inter-esterification of propylene glycol with sebacic acid to give a polypropylene sebacate such as Reoplex 100 (Reoplex is a registered trade mark) and Paraplex 100 (Paraplex is a registered trade mark). The unsaturated polyester resin composition suitably contains 2.0 to 15.0 parts by weight and preferably 7.0 to 11.0 parts by weight of saturated liquid polyester for every 100 p.b.w. of the combined weight of unsaturated polyester and copolymerisable monomer present.

Particularly preferred thermoplastic polymers consisting essentially of polymerised caprolactone units are caprolactone homopolymers of weight average molecular weights in the range 30,000 to 50,000. These polymers are solids having relatively low melting points, e.g. of the order of 60°C. Such polymers containing some carboxyl functionality can give useful results.

The quantity of thermoplastic polymer should be sufficient to prevent the exudation of the saturated liquid polyester from sheet moulding compounds prepared from the unsaturated polyester resin compositions of the present invention, both before and during the moulding process. Typically the weight of thermoplastic polymer used is of the same order as the weight of saturated liquid polyester e.g. from 4.0 to 15.0 parts by weight and preferably from 7.0 to 11.0 parts by weight, for every 100 parts by weight of the combined weight of the unsaturated polyester and copolymerisable monomer. The thermoplastic polymer is suitably added to the composition as a solution having, for example, a concentration of about 33.3% by weight, in part of the total quantitiy of the copolymerisable monomer employed.

The unsaturated polyester composition may contain any of the polymerisation ingredients conventionally present in polyester moulding materials. Examples of such ingredients are polymerisation inhibitors to prevent the premature polymerisation on storage such as butylated hydroxy toluene, hydroquinone, t-butylcatechol; and polymerisation initiators e.g. benzoyl peroxide, ditertiary butyl peroxide, tertiary butyl perbenzoate and methyl ethyl ketone peroxide.

The present invention is further an unsaturated polyester resin based sheet moulding compound comrising (1) an unsaturated polyester resin composition as hereinbefore described, (2) a fibrous reinforcement (3) a mineral filler and (4) a maturation agent as hereinafter defined.

Suitably the unsaturated polyester resin composition constitutes from 20 to 40% by weight and preferably from 25 to 35% by weight of the weight of the total sheet moulding compound.

The fibrous reinforcement is suitably present in the form of a continuous sheet or as random fibres. Such fibrous reinforcing materials are well known in the art. The preferred fibrous reinforcing material is glass fibre, either in sheet form based on chopped strands or continuous filaments or loose chopped strands. Suitably the sheet moulding compounds of the present invention contain from 15 to 40% by weight and preferably from 20 to 35% by weight of fibrous reinforcement based on the total weight of the sheet moulding compound.

Mineral fillers suitable for use in the sheet moulding compounds of the present invention are those well known in the art for use in unsaturated polyester moulding compositions. The filler can consist entirely of a bulking filler, for example calcium carbonate, alumina, calcium sulphate, blanc fixe and clay, or may include additionally pigments, for example titanium dioxide, and fire retarding agents for example chlorinated paraffins, pentabromotoluene, and antimony oxide. The total weight of such fillers used in the sheet moulding compounds of the present invention is suitably in the range 20 to 50% by weight and preferably in the range 30 to 40% by weight, based on the total weight of the sheet moulding compound.

By maturation agent is meant throughout this specification a compound which causes an increase in viscosity of the unsaturated polyester resin used in the sheet moulding compound over a period of time and causes gel formation of the resin without the commencement of the vinyl copolymerisation between the unsaturated polyester and the copolymerisable monomer. This viscosity increase enables the mixture of polyester resin composition, fillers and maturation agent to be applied to the fibrous reinforcement in a relatively fluid form, allowing thorough wetting of the fibres by the resin to occur before the viscosity of the resin increases to give a sheet moulding compound which is stiff enough to be easily handled and stored. Suitable maturation agents include the oxides and/or hydroxides of elements in Group IIA of the periodic table, especially calcium and magnesium. The rate at which such compounds thicken an unsaturated polyester resin composition and the final viscosity increase achieved varies considerably with the particular compound chosen, the quantity added, the nature of the unsaturated polyester used, the particle size of the filler and the water content of the composition. Ideally, the maturation agents should cause a minimum viscosity increase in the first few hours after application of the resin system to the fibrous reinforcement, followed by a rapid increase in viscosity over a short period of time to the desired maximum. This is most suitably achieved by the use of a mixture of such agents. For example a mixture of calcium oxide which itself gives a slow rate of viscosity increase, and calcium hydroxide, which itself gives a fast rate of viscosity increase, being particularly preferred. As these maturation agents are generally not soluble in the polyester resin composition, they are suitably predispersed in a small quantity of the copolymerisable monomer before incorporation in the sheet moulding compound. The amount of maturation agent used is suitably in the range 0.1 to 3.5% by weight expressed as the weight of the metal component of the maturation agent based on the weight of the unsaturated polyester together with the copolymerisable monomer.

The sheet moulding compounds of the present invention may be prepared by passing a glass fibre mat through a polyester resin mix i.e. a mixture of the remaining ingredients of the sheet moulding compound as herein described, interleaving the wetted mat between polyethylene films and passing it through compression rolls to effect impregnation of the glass by the resin mix. Further kneading and compression may be carried out by ribbed rollers if required.

Alternatively sheet moulding compound may be prepared by coating layers of polyester resin mix onto polyethylene films, applying a glass fibres produced by chopping glass roving before bringing the films together to form a composite and passing this composite through compression rollers to effect impregnation of the glass by the resin mix.

The unsaturated polyester resin compositions of the present invention and the sheet moulding compounds prepared therefrom are illustrated in the following examples.

EXAMPLES 1 to 5

A series of sheet moulding compounds were prepared by passing a glass fibre mat through an unsaturated polyester resin composition made up from the following ingredients:

| Ingredient | Parts by Weight |
|---|---|
| 1. An unsaturated polyester derived from maleic anhydride, carbic anhydride and propylene glycol and dissolved in styrene (65% w/w) | see table |
| 2. Polypropylene adipate (Hexaplas PPA) | " |
| 3. Polycaprolactone (PCL) dissolved in styrene (33½% w/w) | " |
| 4. Catalyst | 0.8 |
| 5. Zinc stearate | 1.7 |
| 6. Stearic acid | 0.8 |
| 7. Butylated hydroxy toluene | 0.1 |
| 8. Calcium carbonate filler | 46.5 |
| 9. Titanium dioxide | 1.0 |
| 10. Maturation agent - styrene | 1.5 |
| calcium hydroxide | 1.0 |

The wetted mat was interleaved between polyethylene films and passed through compression rolls to effect good impregnation of the glass fibre mat. The resultant sheet moulding compounds contained approximated 33.3 parts of glass per 100 parts of the above unsaturated polyester resin compositions. The sheet moulding compounds were moulded at 135°C under a pressure of 500 p.s.i.

In all cases high quality moulded products were obtained which showed an apparent expansion in size compared with the size of the mould. This expansion is given in the table below expressed in thous per inch length of mould.

Table

| Example No. | 1 | 2 | 3 | 4 | 5 |
|---|---|---|---|---|---|
| Unsaturated polyester sol" | 30.5 | 33.5 | 31.5 | 32.5 | 33.5 |
| Hexaplas PPA | 4.0 | 4.0 | 3.0 | 2.0 | 1.0 |
| Polycaprolactone solution | 12.0 | 9.0 | 12.0 | 12.0 | 12.0 |
| Expansion — thous/inch | 0.84 | 0.52 | 0.39 | 0.30 | 0.06 |

We claim:

1. An unsaturated polyester resin composition for sheet moulding compounds comprising (1) an unsaturated polyester, (2) a copolymerisable monomer, (3) 2 to 15 parts by weight per 100 parts by weight of the combined weight of said unsaturated polyester and copolymerisable monomer of a saturated liquid polyester and (4) 4 to 15 parts by weight per 100 parts by weight of the combined weight of said unsaturated polyester and copolymerisable monomer of a thermoplastic polymer consisting essentially of polymerised caprolactone units.

2. A composition as claimed in claim 1 wherein the saturated liquid polyester is a polypropylene adipate or sebacate.

3. A composition as claimed in claim 1 wherein the thermoplastic polymer is a caprolactone homopolymer.

4. A sheet moulding compound comprising (1) an unsaturated polyester resin composition, (2) a glass fibre reinforcement, (3) a mineral filler, and (4) a maturation agent, said component (1) comprising an unsaturated polyester, a copolymerisable monomer, 2 to 15 parts by weight per 100 parts by weight of the combined weight of said unsaturated polyester and copolymerisable monomer of a saturated liquid polyester and 4 to 15 parts by weight per 100 parts by weight of the combined weight of said unsaturated polyester and copolymerisable monomer of a thermoplastic polymer consisting essentially of polymerised caprolactone units.

5. A sheet moulding compound as claimed in claim 4 in which the unsaturated polyester resin composition constitutes from 20 to 40% by weight of the sheet moulding compound.

6. Moulded products when prepared from a sheet moulding compound as claimed in claim 4.

* * * * *